UNITED STATES PATENT OFFICE.

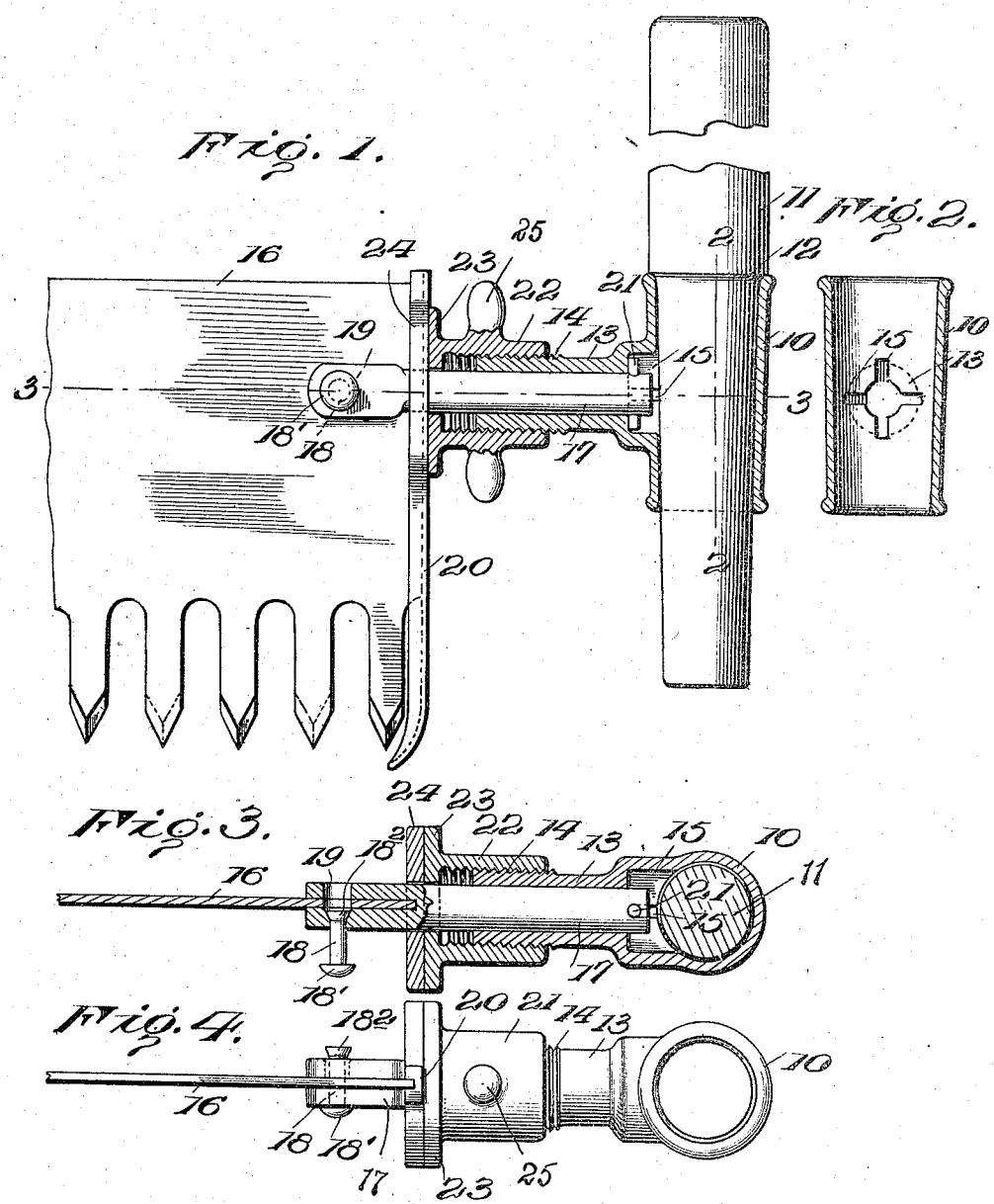

HERMAN J. PETERSON, OF PHILOMATH, OREGON.

DETACHABLE SAW-HANDLE.

1,301,315.      Specification of Letters Patent.      Patented Apr. 22, 1919.

Application filed August 7, 1917. Serial No. 184,920.

*To all whom it may concern:*

Be it known that I, HERMAN J. PETERSON, a citizen of the United States, residing at Philomath, in the county of Benton and State of Oregon, have invented certain new and useful Improvements in Detachable Saw-Handles, of which the following is a specification.

This invention relates to improvements in detachable saw handles, more particularly to devices of this character employed in connection with cross-cut saws actuated by two men, and has for one of its objects to simplify and improve the construction and increase the efficiency of devices of this character.

Another object of the invention is to provide a device of this character which may be quickly attached or detached from the saw, or changed from one saw to another without structural change in the saw.

Another object of the invention is to provide a device of this character which may be readily reversed in position so that the operating handle may be disposed transversely of the saw blade or in vertical alinement therewith without detaching any of the parts.

With these and other objects in view, the invention consists in certain novel features of construction, as hereinafter shown and described and then specifically pointed out in the claims; and in the drawings illustrative of the preferred embodiment of the invention—

Figure 1 is a sectional elevation of the improved device;

Fig. 2 is a section of the ferrule on the line 2—2 of Fig. 1;

Fig. 3 is a section on the line 3—3 of Fig. 1;

Fig. 4 is a plan view with the hand grip member detached.

The improved device comprises a ferrule 10, preferably slightly tapered, and in which the operating handle 11 is inserted. The handle will preferably be formed with one portion reduced to enter the socket, thus forming a slight lateral shoulder 12 to limit the movement of the handle in one direction. Extending from the ferrule 10 is a sleeve 13 externally threaded as shown at 14, at one end. The interior of the sleeve communicates with the interior of the ferrule 10 and is formed with a plurality of radially disposed seats 15 communicating with the interior of the ferrule. A portion of a conventional saw is represented at 16, and coupled to the saw is a pin represented as a whole at 17, and closely fitting within the sleeve 13. At one end the member 17 is forked to bear upon opposite sides of the saw blade 16. The forked portion of the pin 17 is apertured transversely to receive a coupling pin 18, the aperture at one side being larger than at the other side as shown at 19, in Fig 3, and the inner portion of the other part of the aperture countersunk. One terminal of the pin 18 is headed as shown at 18' while the other end is enlarged as shown at $18^2$.

By this arrangement the pin 18 can be withdrawn to a sufficient extent to release the saw 16 as illustrated in Fig. 3, but is prevented from being fully withdrawn by the enlarged end $18^2$.

When the saw is inserted the pin 18 is moved into the position shown in Fig. 4, and when strain is applied to the handle device, the coupling between the saw and handle will not be loosened under the jars and concussions to which it will be subjected when in use. The locking pin 18 remains in connection with the forked pin 17, and will not therefore become misplaced or lost.

A guard member 20 is disposed over the adjacent end of the saw and is perforated to enable the pin 17 to pass therethrough. The pin 17 is provided with a transverse stud 21 projecting at its opposite ends beyond the pin and adapted to engage alternately in the seats 15. The seats are disposed at right angles to each other as shown in Fig. 2, so that when the studs 21 are engaged with one set of the seats 15 the ferrule 10 and the handle 11 will be disposed at right angles to the side faces of the saw blade. Thus the handle may be disposed in either desired position by simply changing the relative position of the studs 21 and the seats 15.

Mounted upon the sleeve 13 is a locking collar 22 with a portion internally threaded to engage the threads of the sleeve. At one end the collar 22 is enlarged as shown at 23, to bear upon a correspondingly enlarged portion 24 of the guard 20. The collar 22 is provided with means to enable it to be forcibly rotated, for instance laterally directed finger lugs 25.

With a device thus constructed it will be obvious that by rotating the collar 22 in one direction the sleeve 13 together with the ferrule 10 will be moved toward the guard 20 and thus cause the stud 21 to be released from the seats 15, and enable the handle and the ferrule to be adjusted to engage the stud with either one of the sets of seats, thus enabling the relative positions of the handle and the saw blade to be changed. Then when the required adjustment has been made the sleeve 22 is rotated in the opposite direction and thus operates as a locking member to firmly couple the ferrule and the handle to the saw blade.

It will be noted that no portion of the improved implement projects in advance, or outwardly from the ferrule, but all the parts are disposed between the ferrule and the saw blade or its guard. The lugs 25 it will be noted are located relatively close to the guard 20, consequently will not interfere with the hands of the operator no matter in what position they may be disposed.

The improved implement is simple in construction, can be inexpensively manufactured and wholly of metal.

It will also be noticed that in the improved device it is not necessary to perforate the handle or otherwise decrease its strength.

Having thus described the invention, what is claimed as new is:

1. A detachable saw handle including a ferrule having a tubular sleeve formed integral therewith, the walls of said ferrule and sleeve being circumferentially continuous, there being laterally directed seats formed in the sleeve at its juncture with the ferrule and disposed at substantially right angles to each other, a pin extending longitudinally through the sleeve and having means at one end thereof for engagement with a saw, the pin between the saw engaging end and its opposite end being of uniform diameter, studs extending laterally from the pin and alternately engageable in said seats, a handle fitted to the ferrule and limiting the movement of said pin in one direction, and locking means applied to the sleeve and operating to apply strain between the saw and ferrule.

2. A detachable saw handle including a ferrule having a tubular sleeve formed integral therewith, the walls of said ferrule and sleeve being circumferentially continuous, there being laterally directed seats formed in the sleeve at its juncture with the ferrule and disposed substantially at right angles to each other, the outer end of the sleeve being externally threaded, a pin extending through said sleeve and having one end thereof provided with means for engagement with a saw, the opposite end of the pin being of uniform diameter throughout its length, studs extending laterally from the pin and alternately engageable in said seats, a handle fitted in the ferrule and limiting the movement of the pin in one direction, a hand guard engaging the adjacent end of the saw and having its intermediate portion enlarged laterally and provided with a flat bearing surface, and an adjusting collar threaded on the sleeve and provided with a laterally extending flange adapted to bear against the flat bearing surface of the guard when said collar is rotated to clamp the several parts in position.

In testimony whereof I affix my signature.

HERMAN J. PETERSON. [L. S.]

Copies of this patent may be obtained for five cents each, by addressing the "Commissioner of Patents, Washington, D. C."